US007663672B2

(12) United States Patent
Okada

(10) Patent No.: US 7,663,672 B2
(45) Date of Patent: *Feb. 16, 2010

(54) IMAGE PICKUP APPARATUS AND RECORDING CONTROL APPARATUS

(75) Inventor: Masaki Okada, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 1245 days.

This patent is subject to a terminal disclaimer.

(21) Appl. No.: 10/627,737

(22) Filed: Jul. 28, 2003

(65) Prior Publication Data
US 2004/0017489 A1 Jan. 29, 2004

Related U.S. Application Data

(62) Division of application No. 08/991,876, filed on Dec. 16, 1997, now Pat. No. 6,630,954.

(30) Foreign Application Priority Data
Dec. 17, 1996 (JP) .................................. 8-336931

(51) Int. Cl.
H04N 5/76 (2006.01)

(52) U.S. Cl. .................................. 348/231.3; 348/231.2

(58) Field of Classification Search ............. 348/231.99, 348/231.1, 231.2, 231.3, 231.7, 231.8
See application file for complete search history.

(56) References Cited

U.S. PATENT DOCUMENTS

| 5,093,731 | A | 3/1992 | Watanabe et al. | 348/232 |
| 5,153,729 | A | 10/1992 | Saito | 348/231 |
| 5,212,556 | A | 5/1993 | Ogawa | 348/220 |
| 5,473,370 | A | 12/1995 | Moronaga et al. | 348/231 |
| 6,686,958 | B1 * | 2/2004 | Watanabe et al. | 348/231.1 |

FOREIGN PATENT DOCUMENTS

JP    8-140027    5/1996

* cited by examiner

Primary Examiner—Tuan Ho
(74) Attorney, Agent, or Firm—Fitzpatrick, Cella, Harper & Scinto

(57) ABSTRACT

In an electronic camera, an image file can be erased, and when the image file is erased, a state of notification to the user is changed in accordance with the data attached to an image. In the electronic camera, the data attached to the image indicates whether or not the image file previously has been transferred from a storing area where the image is stored at present to another storing area.

14 Claims, 4 Drawing Sheets

IMAGE PICKUP APPARATUS AND RECORDING CONTROL APPARATUS The present application is a division of Application No. 08/991,876 filed Dec. 16, 1997, issued as U.S. Patent No. 6,630,954 on Oct. 7, 2003, the entire contents of which is incorporated herein by reference.

BACKGROUND OF THE INVENTION

1. Field of the Invention

The invention relates to an image pickup apparatus such as an electronic camera and to a recording control apparatus. More particularly, the invention relates to an image pickup apparatus such as an electronic camera having means for erasing an image file which was recorded after photographing, and to a recording control apparatus.

2. Related Background Art

Hitherto, when an image file is erased in an electronic camera, in order to prevent an erroneous erasure, there is used a measure such that the camera is made operative only when a plurality of switches are simultaneously depressed, an erasing switch is arranged at a position where it is difficult to be depressed, an advance notice for start of the erasure is displayed when the erasing switch is depressed, the erasure is inhibited when the image file is not transferred anywhere, or the like.

In the above conventional methods, however, the erroneous erasure cannot be perfectly eliminated and there is a case where the image file is carelessly and erroneously erased. There is also a drawback in that even when erasing an image file which can be erased, it cannot be easily erased.

SUMMARY OF THE INVENTION

To overcome at least one of the foregoing drawbacks, according to an embodiment of the present invention, there is provided an electronic camera comprising: image pickup means for picking up an object; storing means for storing an image picked up by the image pickup means; erasing means for erasing the image stored by the storing means; and notifying means for notifying the user of an advance notice of the erasure of the image by the erasing means, wherein the notifying means changes a content of the notification in accordance with data attached to the image as a target to be erased.

According to another aspect, there is provided an electronic camera, wherein sound generating means is constructed by a buzzer and at least one of a frequency of the buzzer, a sound generating period of the buzzer, and a sound generating time of the buzzer is changed in accordance with the data attached to the image which is erased by the erasing means.

The above and other objects and features of the present invention will become apparent from the following detailed description and the appended claims with reference to the accompanying drawings.

DETAILED DESCRIPTION OF THE PREFERRED EMBODIMENTS

Figure 1:
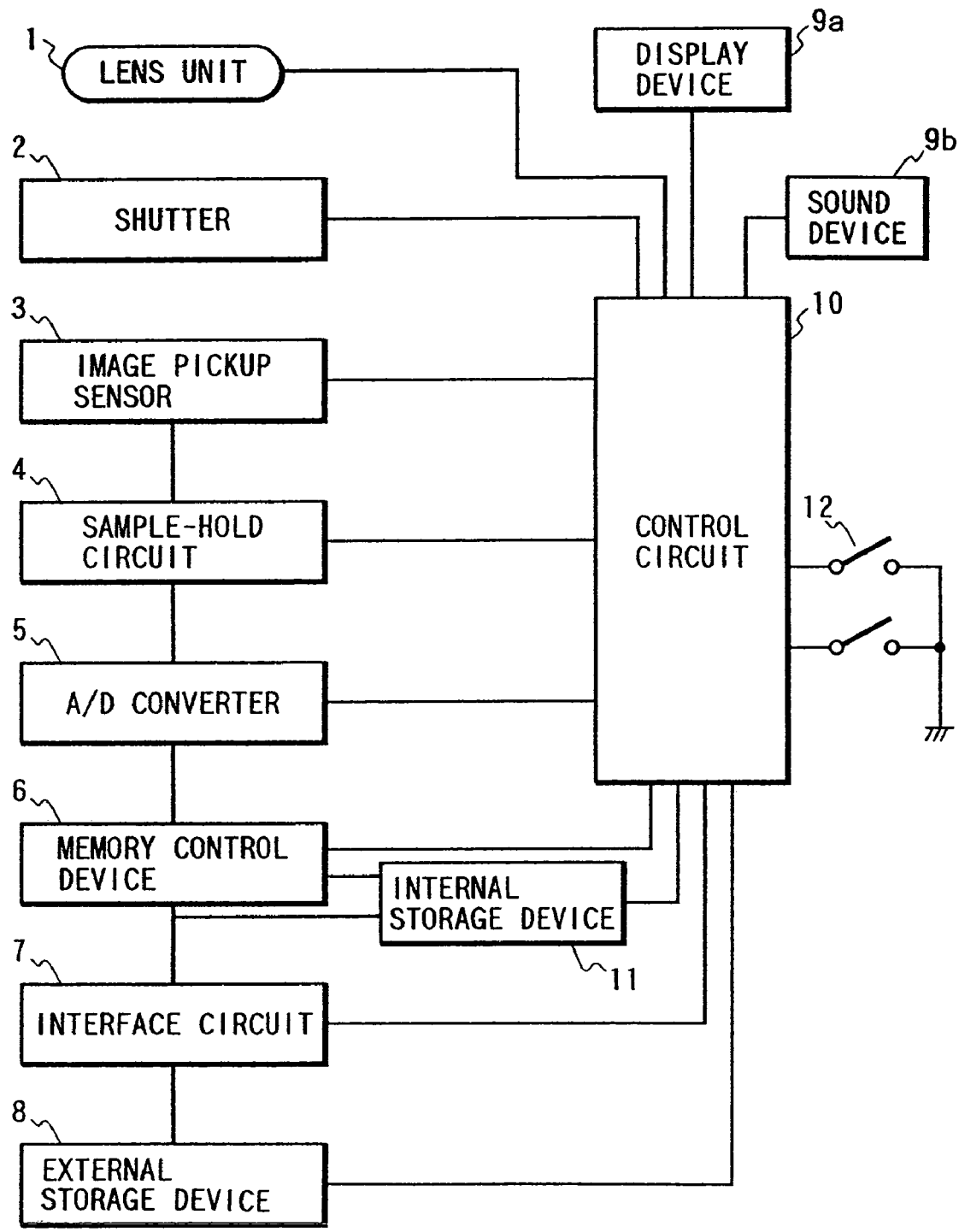
FIG. 1 is a block constructional diagram of an electronic camera of each embodiment.

FIG. 1 first shows a constructional diagram of an image pickup apparatus according to the first embodiment of the invention. In FIG. 1, reference numeral 1 denotes a lens unit whose focal distance can be changed; 2 a shutter for controlling an exposing time; 3 an image pickup sensor such as a solid state image pickup device or the like which picks up an object and also has functions to measure a distance, light, and a color; 4 a sample-hold circuit for detecting an image signal itself from the image pickup sensor 3; 5 an A/D converter for converting the analog image signal from the sample-hold circuit 4 to a digital signal; 6 a memory control device for controlling a storing operation, a reading operation, and an erasing operation for a storage device; 7 an interface circuit for connecting an external storage device to the image pickup apparatus; 8 the external storage device attached to the outside; 9a a display device such as an LED and/or LCD or the like for displaying a state of the apparatus; 9b a sound device such as a buzzer or the like for indicating a state of the apparatus; 10 a control circuit which is mainly constructed by a CPU and its peripheral circuit and controls the whole apparatus; 11 an internal storage device built in the apparatus; and 12 a switch group for inputting operation instructions, e.g., to pickup an image, recording to the storage device, erasure, and the like.

Figure 2:
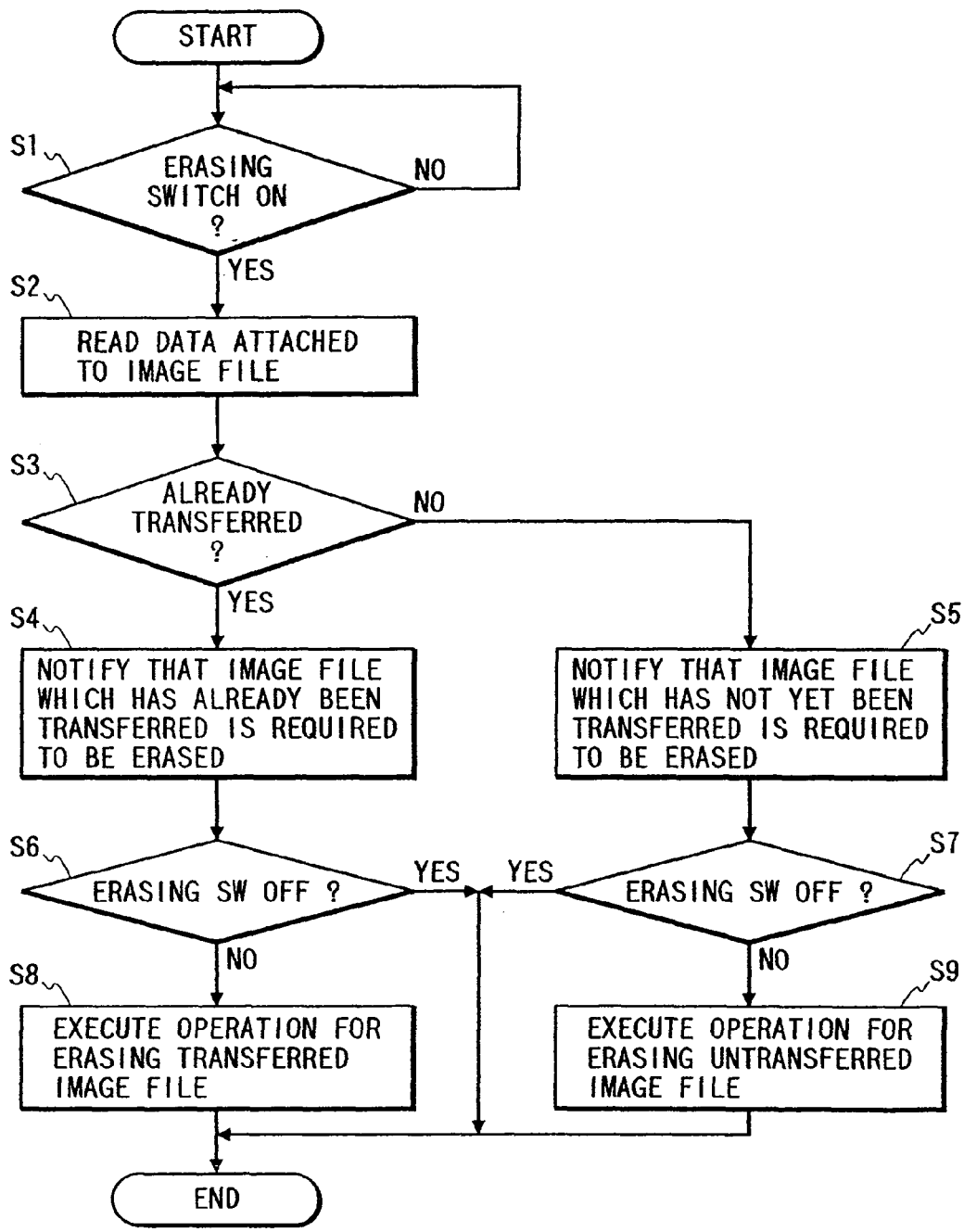
FIG. 2 is a flowchart of the first embodiment.

FIG. 2 shows a control flowchart of the control circuit 10 according to the first embodiment of the present invention. First in step S1, when an erasing switch comprised in the switch group 12 is ON, step S2 follows. When the erasing switch is OFF, the processing routine waits in step S1. In step S2, data attached to an image selected at that time is read and step S3 follows. The data attached to the image indicates whether an image file thereof previously has been transferred to any other storing area or not. A storing location of the data attached to the image may be a location in the image file or in another file attached to the image file. It is assumed that the selection of an image is separately performed by a key operation and is not a characteristic part of the embodiment, so that its detailed description is omitted here. In step S3, a check is made to see if the image file has been transferred to any other storing area before. If the image file has been transferred to any other storing area before, step S4 follows. If NO, step S5 follows.

In step S4, a message informing the user that the transferred image file is generated. Specifically speaking, a flickering of the LED, a display of the LCD, or a sound generation of the buzzer is executed. For example, in this embodiment, in the case of flickering the LED, it is assumed that a green LED is lit ("on") for 250 microseconds at a flickering period of 1 Hz. In the case of displaying the LCD, it is assumed that an "OK" mark and an "ERASING" mark are always indicated and an "ATTENTION" mark is indicated for only 250 microseconds. In the case of the sound generation of the buzzer, it is assumed that a sound of a frequency of 4 kHz is generated for only 250 microseconds at a period of 1 Hz.

By performing the notification as mentioned above in step S4 by at least one of those methods, a message that the image to be erased has already been transferred to another storing area is notified to the user of an electronic camera, and step S6 follows. In step S6, when the erasing switch is turned off from the ON state, the processing routine is finished. If NO, step S8 follows. In step S8, the transferred image file is erased while displaying the "ERASING" mark and the processes are finished.

When it is determined that the image is not yet transferred, in step S5, a message that the image file which is not transferred is to be erased is notified to the user. Specifically speaking, the flickering of the LED, the display of the LCD, or the sound generation of the buzzer is executed in a state different from that in the case of erasing the transferred image file. For example in the case of flickering the LED, it is assumed that a red LED is lit ("on") for 10 seconds at a flickering period of 4 Hz. In the case of displaying the LCD, a "WARNING" mark is always indicated, the "ERASING" mark is flickered at a period of 2 Hz, and the "ATTENTION" mark is indicated for 10 seconds. In the case of the sound generation of the buzzer, a sound of a frequency of 400 Hz is generated for 10 seconds at a period of 4 Hz.

The notification as mentioned above in step S5 is performed by at least one of the above methods, thereby notifying the user that the image to be erased is not transferred to another storing area. Step S7 follows. In step S7, when the erasing switch is turned off from the ON state, the processing routine is finished. When the erasing switch is ON, step S9 follows. In step S9, the image file which is not transferred is erased while displaying the "ERASING" mark. The processing routine is finished.

With this construction, before the erasure, the user can know whether the image has been transferred to another storing area or not in steps S4 and 55. Therefore, by turning off the erasing switch in a predetermined time, an erroneous erasure can be prevented.

Figure 3:
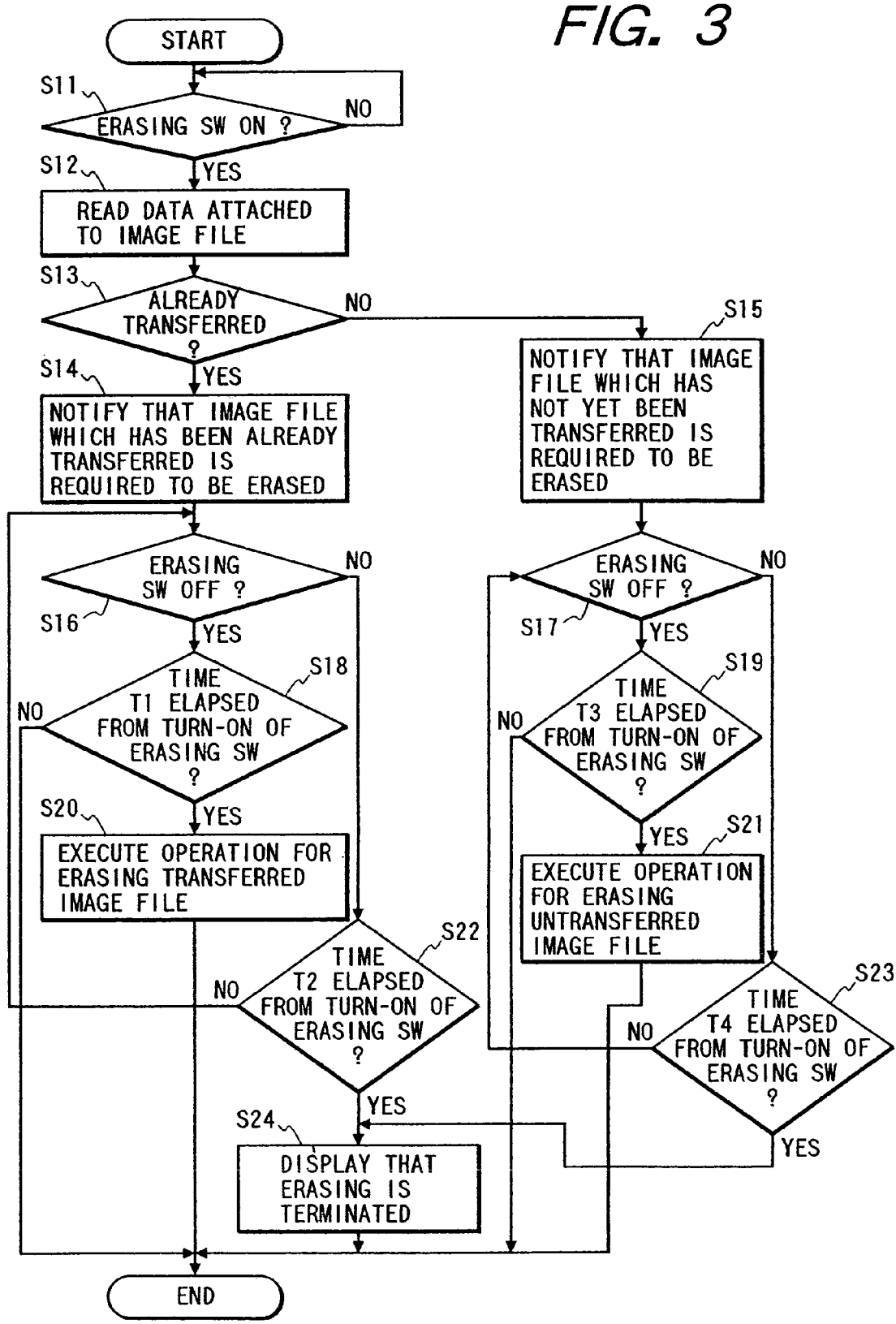
FIG. 3 is a flowchart of the second embodiment.

FIG. 3 shows a control flowchart of 10 in the second embodiment of the present invention. First in step S11, when the erasing switch comprised in the switch group 12 is ON, step S12 follows. If NO, step S11 repeats. In step S12, data attached to the image selected in this instance is read and step S13 follows. The data attached to the image shows whether the image file has been transferred to another storing area before or not. A storing location of the data may be a location in the image file or in another file attached to the image file. It is assumed that the selection of the image is separately performed by a key operation and is not a feature of the embodiment. Therefore, its detailed description is omitted here. In step S13, a check is made to see if the image file has been transferred to any other storing area before. If the image file previously has been transferred to any other storing area, step S14 follows. If NO, step S15 follows.

In step S14, a message informing the user that the transferred image file is generated. Specifically speaking, a flickering of the LED, a display of the LCD, or a sound generation of the buzzer is executed. For example, in this embodiment, in the case of flickering the LED, it is assumed that a green LED is lit ("on") for 250 microseconds at a flickering period of 1 Hz. In the case of displaying the LCD, it is assumed that the "OK" mark and the "ERASING" mark are always indicated and the "ATTENTION" mark is indicated for only 250 microseconds. In the case of the sound generation of the buzzer, it is assumed that a sound of a frequency of 4 kHz is generated for only 250 microseconds at a period of 1 Hz.

By performing the notification as mentioned above in step S14 by at least one of those methods, a message that the image to be erased has already been transferred to another storing area is notified to the user of the electronic camera, and step S16 follows. In step S16, when the erasing switch is turned off from the ON state, the processing routine advances to step S18. When the ON state continues, step S22 follows. In step S18, a check is made to see if a predetermined time T1 has elapsed from the time the erasing switch was turned on to the time the erasing switch was turned off. When the predetermined time T1 elapses after the time the erasing switch is turned on, step S20 follows. If NO, the image file is not erased but the processing routine is finished. The transferred image file is erased while displaying the "ERASING" mark in step S20 and the processes are finished.

When the ON state of the erasing switch continues, a check is made in step S22 to see if a predetermined time T2 has elapsed after the time the erasing switch was turned on. When the predetermined time T2 elapses after the erasing switch was turned on, step S24 follows. If NO, the processing routine is returned to step S16.

When it is determined that the image is not yet transferred, in step S15, a message is generated notifying the user that the image file which is not transferred is to be erased. Specifically speaking, the flickering of the LED, the display of the LCD, or the sound generation of the buzzer is executed in a state different from that in the case of erasing the transferred image file. For example, in the case of flickering the LED, it is assumed that the red LED is lit ("on") for 10 seconds at a flickering period of 4 Hz. In the case of displaying the LCD, the "WARNING" mark is always indicated, the "ERASING" mark is flickered at a period of 2 Hz, and the "ATTENTION" mark is indicated for 10 seconds. In the case of the sound generation of the buzzer, a sound of a frequency of 400 Hz is generated for 10 seconds at a period of 4 Hz.

The notification as mentioned above in step S15 is performed by at least one of the above methods, thereby notifying the user that the image to be erased is not transferred to another storing area. Step S17 follows.

In step S17, when the erasing switch is turned off from the ON state, step S19 follows. If NO, step S23 follows. In step S19, a check is made to see if a predetermined time T3 has elapsed from the time the erasing switch is turned on to the time the erasing switch is turned off. When the predetermined time T3 elapses after the time the erasing switch is turned on, step S21 follows. If NO, the processing routine is finished. In step S21, the image file which is not transferred is erased while displaying the "ERASING" mark and the processes are finished.

When the ON state of the erasing switch is continued, a check is made in step S23 to see if a predetermined time T4 has elapsed after the erasing switch was turned on. When the predetermined time T4 elapses after the time the erasing switch is turned on, step S24 follows. If NO, the processing routine is returned to step S17. In step S24, a message informing that the erasing operation was stopped is displayed and the processing routine is finished. With this construction, before the image is erased, the user can know whether the image has been transferred to another storing area or not in steps S14 and S15. Therefore, an erroneous erasure can be prevented by turning off the erasing switch from the ON state in a time shorter than the predetermined times T1 and T3. If the erasing switch is erroneously turned on and the predetermined times T1 and T3 has elapsed, by holding the erasing switch in the ON state for the predetermined times T2 and T4 or more, the erasure of the image file can be also cancelled and an erroneous erasure can be prevented even in this case. There are the relations of (T1 <T2 ) and (T3<T4 ) among the predetermined times T1 to T4. By setting (T1 <T3 ), as for the image file which is not transferred, an advance notice of the erasure of a longer time can be performed as compared with the time in the case of the transferred image file. The erroneous erasure of an original image which is not transferred can be prevented.

Figure 4:
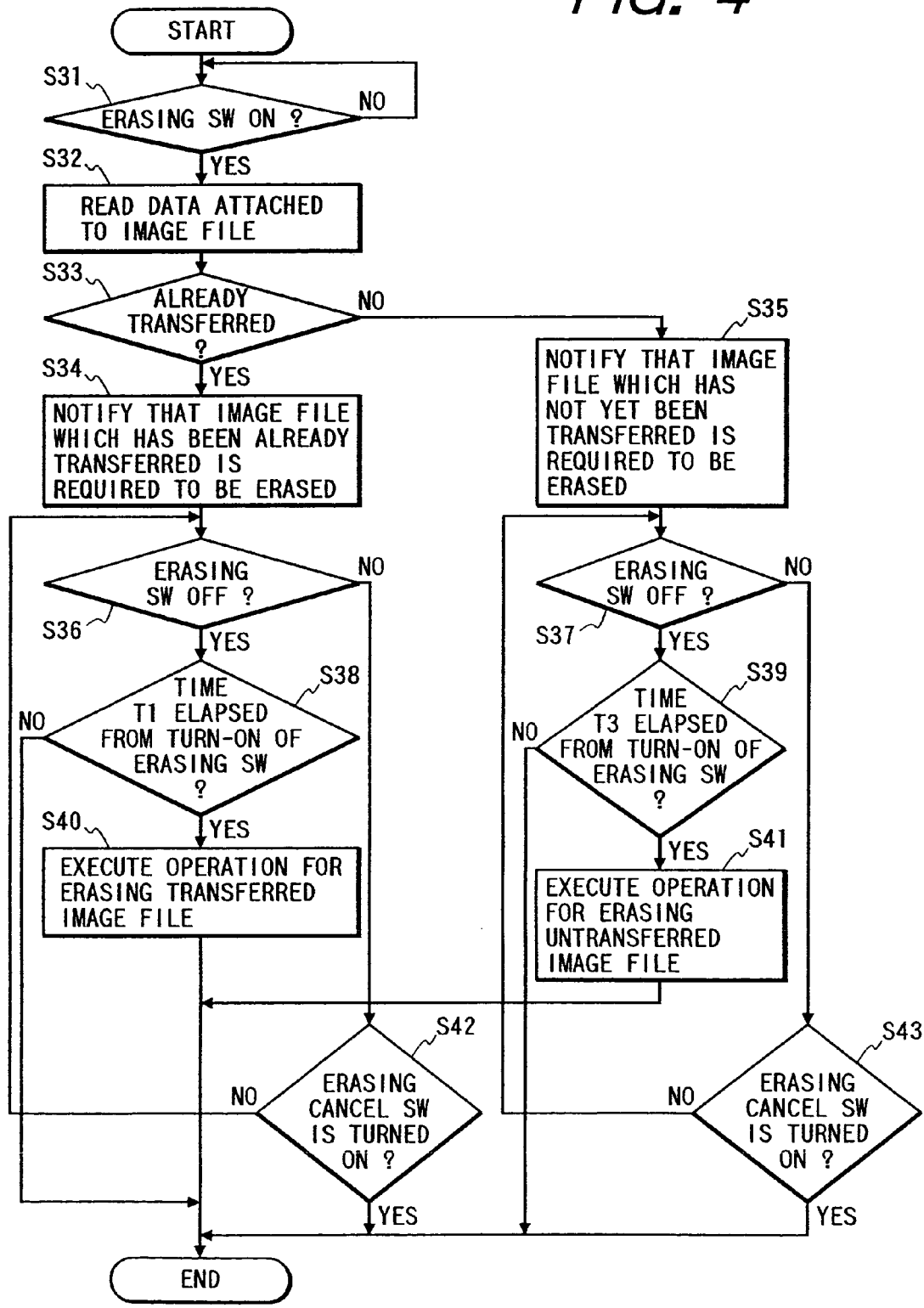
FIG. 4 is a flowchart of the third embodiment.

FIG. 4 shows a control flowchart of the control circuit 10 according to the third embodiment of the present invention.

First, in step S31, when the erasing switch provided in the switch group 12 is ON, step S32 follows. If NO, step S31 repeats. In step S32, data attached to the image selected at that time is read and the processing routine advances to step S33. The data attached to the image shows whether the image file previously has been transferred to any other storing area before or not. A storing location of the data may be a location in the image file or in another file attached to the image file. It is assumed that the selection of an image is separately performed by a key operation and is not a characteristic part of this embodiment, so that its detailed description is omitted here. In step S33, a check is made to see if the image file previously has been transferred to any other storing area before. If the image file has been transferred to any other storing area before, step S34 follows. If NO, step S35 follows.

In step S34, a message informing that the transferred image file is to be erased is generated. Specifically speaking, a flickering of the LED, a display of the LCD, or a sound generation of the buzzer is executed. For example, in this embodiment, in case of flickering the LED, it is assumed that a green LED is lit ("on") for 250 microseconds at a flickering period of 1 Hz. In case of displaying the LCD, it is assumed that an "OK" mark and an "ERASING" mark are always indicated and an "ATTENTION" mark is indicated for only 250 microseconds. In case of the sound generation of the buzzer, it is assumed that a sound of a frequency of 4 kHz is generated for only 250 microseconds at a period of 1 Hz.

By performing the notification as mentioned above in step S34 by at least one of those methods, a message that the image to be erased has already been transferred to another storing area is notified to the user of the electronic camera, and step S36 follows. In step S36, when the erasing switch is turned off from the ON state, the processing routine advances to step S38. When the ON state is continued, step S42 follows.

In step S38, a check is made to see if the predetermined time T1 has elapsed from the time the erasing switch is turned on to the time the erasing switch is turned off. When the predetermined time T1 elapses after the erasing switch was turned on, step S40 follows. If NO, the processing routine is finished. In step S40, the transferred image file is erased while displaying the "ERASING" mark and the processing routine is finished. When the ON state of the erasing switch is continued, by turning on an erasing cancel switch comprised in the switch group 12 in step S42, the image file is not erased but the processing routine is finished. If NO, step S36 follows.

When it is determined that the image is not yet transferred, in step S35, a message that the image file which is not transferred is to be erased is notified to the user. Specifically speaking, the flickering of the LED, the display of the LCD, or the sound generation of the buzzer is executed in a state different from that in the case of erasing the transferred image file. For example in the case of flickering the LED, it is assumed that the red LED is lit ("on") for 10 seconds at a flickering period of 4 Hz. In the case of displaying the LCD, the "WARNING" mark is always indicated, the "ERASING" mark is flickered at a period of 2 Hz, and the "ATTENTION" mark is indicated for 10 seconds. In the case of the sound generation of the buzzer, a sound of a frequency of 400 Hz is generated for 10 seconds at a period of 4 Hz.

The notification as mentioned above in step S35 is performed by at least one of the above methods, thereby notifying the user that the image to be erased is not transferred to another string area. Step S37 follows. In step S37, when the erasing switch is turned off from the ON state, step S39 follows. When the ON state is continued, step S43 follows. In step S39, a check is made to see if the elapsed time from the time the erasing switching is turned on to the time the erasing switch is turned off is equal to the predetermined time T3. When the predetermined time T3 elapses after the erasing switch was turned on, step S41 follows. If NO, the processing routine is finished.

In step S41, the image file which is not transferred is erased while displaying the "ERASING" mark and the processing routine is finished. When the ON state of the erasing switch is continued, in the case where the erasing cancel switch is turned on, a message informing the user that the erasing operation of the image file was stopped is displayed in step S43. The processing routine is finished. If NO, the processing routine is returned to step S37. With this construction, before the image is erased, the user can know whether the image has been transferred to another storing area or not in steps S34 and S35. Therefore, an erroneous erasure can be prevented by turning off the erasing switch from the ON state for a time shorter than the predetermined times T1 and T3. If the erasing switch is erroneously turned on and the predetermined times T1 and T3 have elapsed, by turning on the erasing cancel switch, the erasure of the image file can be cancelled and an erroneous erasure can be prevented.

Although each of the foregoing embodiments has been described based on the assumption that the control circuit 10 holds the data attached to the image, specifically speaking, a message informing the user that the transfer instructing switch in the switch group 12 was depressed can be also stored in an internal RAM of the control circuit 10 together with the image number or the image number when the image signal is transferred from the internal storage device 11 to the external storage device 8 also can be stored into the internal RAM together with a fact of the transference.

In the step of displaying that the image file which is not transferred is to be erased, an instruction to again depress the erasing switch in order to forcedly erase the image file also can be displayed simultaneously with this display.

Although the embodiments have been described above with respect to the example of an electronic camera, particularly, when controlling with respect to the recording, reading, and erasing, each embodiment also can be applied to a case of a recording control apparatus in which the easy erasure of the recording information due to a special awakening of attention and carelessness upon erasing is prevented.

According to each of the embodiments as described above, by changing the display format of the display device in accordance with the data attached to the image when erasing the image file, the user can determine the state of the image and can prevent an erroneous erasure. Since the data attached to the image includes data regarding the presence or absence of a prior transfer of the image file or the like from the storing area where the image is stored at present to another storing area, the user can determine whether the image file is an image file which has already been transferred to another storing area and can be erased or an image file existing in only such a storing area, and can prevent erroneous erasure.

The presence or absence of the transference can be distinguished by the LED by at least one of the color of the LED, the flickering period of the LED, and the light-on time of the LED, and/or the presence or absence of the transference can be distinguished by the LCD by at least one of the shape of segment of the LCD, the flickering period of the LCD, and the on time of the LCD, and/or the presence or absence of the transference can be distinguished by the sound device such as a buzzer or the like by at least one of the frequency of the buzzer, the on/off period of the buzzer, and the sound generating time of the buzzer. Thus, the user can easily determine the state and can prevent an erroneous erasure.

By turning off the erasing switch in the first predetermined time, the execution of the erasure of the image file can be stopped, so that the user can determine the state and can prevent the erroneous erasure.

By holding the erasing switch in the ON state for a time longer than the second predetermined time, the execution of the erasure of the image file can be stopped, so that the user judges the state and can prevent the erroneous erasure.

By turning on the erasing cancel switch before the erasing switch is turned off, the execution of the image erasure can be stopped, so that the user can determine the state and can prevent an erroneous erasure.

Processes of the control circuit 10 in another embodiment will now be described.

When the erasing switch is turned on, a display of the LED or the like is performed in accordance with the data attached to the image file. The display of the LED or the like is executed until the image file is erased. After the erasing switch was turned off, when the erasing switch is again turned on within a predetermined time, the image file is erased. After the elapse of the predetermined time, the execution of the erasure of the image is stopped.

Even by constructing the electronic camera as mentioned above, an erroneous erasure of the image can be reliably prevented.

Further, even in a recording control apparatus, an erroneous erasure or the like can be effectively prevented in a manner similar to the case of the electronic camera.

Many widely different embodiments of the present invention may be constructed without departing from the spirit and scope of the present invention. It should be understood that the present invention is not limited to the specific embodiments described in the specification, except as defined in the appended claims.

What is claimed is:

1. An electronic apparatus for use with an image pickup device, comprising:
   a memory control device which controls recording to record on a memory an image file corresponding to an image picked up by the image pickup device, and past-transfer-history data which indicates whether the image file that is currently held in the memory has been ever transferred in the past from the memory to a different storing area or not; and
   a control device that controls transfer of the image file from the memory to a different storing area and rewrites the past-transfer-history data in response to the image file being transferred.

2. An electronic apparatus according to claim 1, further comprising:
   notification means for notifying a user whether or not the image file stored in the memory previously has been transferred from the memory to the different storing area an accordance with the past-transfer-history data attached to the image file.

3. An electronic apparatus according to claim 1, wherein the different storing area is in an external storage apparatus.

4. A data control method for use with an image pickup device, comprising:
   a memory controlling step of controlling recording to record on a memory an image file corresponding to an image picked up by the image pickup device and past-transfer-history data which indicates whether the image file that is currently held in the memory has ever been transferred in the past from the memory to a different storing area or not; and
   a control step of transferring the image file from the memory to a different storing area and rewriting the past-transfer-history data in response to the image file being transferred.

5. A method according to claim 4, further comprising:
   a notification step of notifying a user whether or not the image file stored in the memory previously has been transferred from the memory to the different storing area, in accordance with the past-transfer-history data attached to the image file.

6. A method according to claim 4, wherein the different storing area is in an external storage apparatus.

7. An electronic apparatus which processes an image file, comprising:
   a memory control device that controls a memory to record thereon an image file corresponding to an image picked up by an image pickup device, and past-transfer-history data which indicates whether the image file that is currently held in the memory has ever been transferred in the past from the memory to a different storing area or not; and
   a control device that controls transfer of the image file from the memory to a different storing area and rewrites the past-transfer-history data in response to the image file being transferred.

8. An electronic apparatus according to claim 7, further comprising:
   a notification device that notifies a user whether or not the image file stored in the memory previously has been transferred from the memory to the different storing area in accordance with the past-transfer-history data attached to the image file.

9. An electronic apparatus according to claim 7, wherein the different storing area is an external storing apparatus.

10. An electronic apparatus according to claim 7, wherein the electronic apparatus includes the image pickup device.

11. A data control method for processing an image file, comprising:
   a memory controlling of controlling a memory to record thereon an image file corresponding to an image picked up by an image pickup device and past-transfer-history data which indicates whether the image file that is currently held in the memory has ever been transferred in the past from the memory to a different storing area or not; and
   a control step of controlling transfer of the image file from the memory to a different storing area and rewriting the past-transfer-history data in response to the image file being transferred.

12. A method according to claim 11, further comprising:
   a notification step of notifying a user whether or not the image file stored in the memory previously has been transferred from the memory to the different storing area, in accordance with the past-transfer-history data attached to the image file.

13. A method according to claim 12, wherein the different storing area is an external storage apparatus.

14. An electronic apparatus for use with an image pickup device, comprising:
   a memory control device which controls recording to record on a memory an image file corresponding to an image picked up by the image pickup device, and past-transfer-history data which indicates whether the image file that is currently held in the memory has been ever transferred in the past from the memory to a different storing area or not;

a control device that controls transfer of the image file from the memory to a different storing area and rewrites the past-transfer-history data in response to the image file being transferred;

an erasing switch adapted to be turned on and off, wherein the image file is erasable by said electronic apparatus in response to the turning on of said erasing switch; and a device that reads the data indicating whether the image file that is currently held in the memory has been ever transferred in response to turning the erasing switch on and before said electronic apparatus erases the image file.

* * * * *